June 8, 1954
S. KHALIL
2,680,465
PNEUMATIC VEHICLE TIRE
Filed May 2, 1950
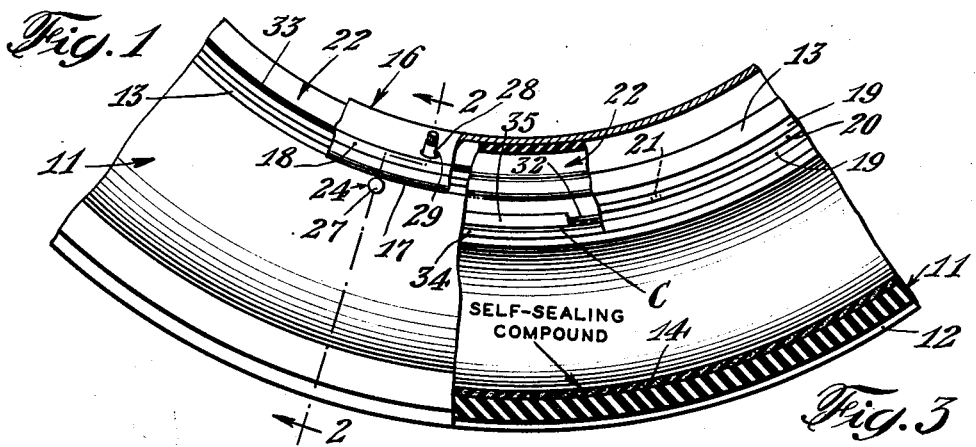
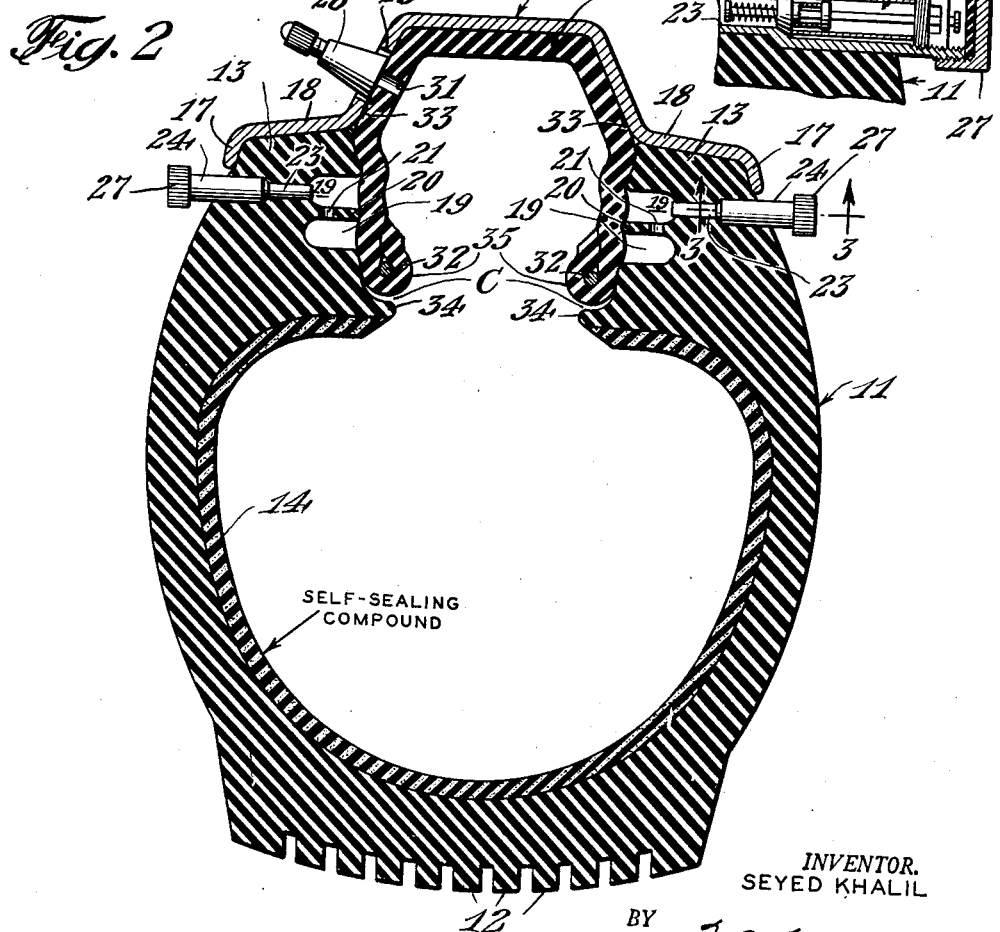
INVENTOR.
SEYED KHALIL
BY
*T. R. Marsh*
ATTORNEY Patented June 8, 1954

2,680,465

UNITED STATES PATENT OFFICE 2,680,465

PNEUMATIC VEHICLE TIRE

Seyed Khalil, New York, N. Y.

Application May 2, 1950, Serial No. 159,455

12 Claims. (Cl. 152—363)

This invention relates primarily to motor vehicle tires of the pneumatic type, and more particularly to a tire casing having beads of novel design and construction to hold thereon, by means of a vacuum, a cooperating member, hereinafter referred to and called a Semi-Tube, which is adapted to airtightly bridge and seal the opening in the tire casing between the beads and maintain air pressure therein without the usual inner tube.

The Semi-Tube consists primarily and substantially of what would be, and it is shaped somewhat like, the inner annular part of a conventional inner tube which, when the conventional tube is inflated in a tire casing, contacts the rim on which the tire is mounted and a part of the inner surfaces of the opposite faces of the rim engaging beads. Furthermore, as in the regular type inner tube, said Semi-Tube of the present invention is of expansible material.

In general, the present invention consists of a tire casing having the outward appearance of a conventional pneumatic tire casing in everyday use on automobiles and trucks. The bead sections of the casing, however, are modified and are somewhat larger in cross-sectional area so as to contain on the opposite inner faces thereof a plurality of interconnected open-faced grooves. When the Semi-Tube is correctly positioned in the tire casing, it covers the open faces of said grooves. The enclosed grooves are called Vacuum Chambers, and the establishment of a vacuum in these chambers holds the Semi-Tube in position while the casing is being mounted on a rim. The vacuum also assists in maintaining an airtight seal between the Semi-Tube and the beads of the casing during use of the tire, and since said Semi-Tube is of expansible material, it is adapted to intimately contact all the inner bead surfaces of the tire casing.

From the above and the following detailed description of the present invention, it can be seen that the Semi-Tube of the present invention differs from prior art devices and has many advantages thereover. These advantages and distinctions include the provision of a Semi-Tube of expansible material rather than a non-expansible unit. The expansibility of my Semi-Tube enables it to contact the inner faces of the bead sections of the casing intimately so as to compensate for inaccuracies and/or non-uniformities in the tire casing beads.

One of the primary objects of the present invention is to provide a tire casing and cooperating Semi-Tube unit having substantially all the advantages of a tubeless tire as well as the advantages of the conventional casing and inner tube unit.

Another object of the present invention is to provide a tire casing and Semi-Tube unit having substantially none of the disadvantages of the conventional tire casing and tube or of the tubeless type tire.

Another object of this invention is to provide a tire casing and a Semi-Tube or bridging member therefor which is held in place by means of a vacuum in addition to air pressure established within the tire casing.

In connection with the above, another object of the invention is to provide means for sealing and holding the engaging surfaces of the Semi-Tube and the beads of the tire casing in contact with one another without the necessity of employing cements, glues or other like sealing and cementing materials.

Still another object of this invention is to provide a Semi-Tube or bridging member for a tire casing of the above type which is readily removable to permit inspection of the tire casing and/or the Semi-Tube and repairs thereof when and if necessary.

Another object of this invention is to provide in a Semi-Tube or bridging member and a tire casing unit of the above type a novel arrangement of removing the Semi-Tube from the casing by establishing air pressure in the compartments normally having a vacuum, which vacuum as noted above assists in holding the Semi-Tube in position and establishing an airtight seal between it and the casing.

Still another object of this invention is to provide means for readily mounting and demounting said Semi-Tube respectively to and from said casing.

The above and further objects of the invention will be more apparent in the following detailed description wherein reference is made to the accompanying drawings showing the preferred embodiment of the invention. In the drawings:

Fig. 1 is a fragmentary side detail view of a section of the tire casing, rim and Semi-Tube with various sections and parts thereof broken away;

Fig. 2 is a transverse sectional view of the tire casing, Semi-Tube and rim, taken substantially on line 2—2 of Fig. 1; and Fig. 3 is a detail view of the vacuum chamber valve taken substantially on line 3—3 of Fig. 2.

In the drawings, reference numeral 11 indicates generally the tire casing which in outward appearances is substantially similar to conventional types of casings in everyday use on automobiles and trucks. The tire casing 11 has the usual tread section 12 which engages the road surface and may be of any appropriate design.

The tire casing also has the usual spaced apart rim engaging beads, indicated by reference numeral 13, which are adapted to engage the rim on which the tire is mounted. The beads 13 preferably contain reinforcing wires (not shown) as is the usual practice and the casing itself preferably has formed integrally therewith the usual reinforcing plies extending throughout the major portion of the casing surface as well as so-called breaker strips positioned underneath the tread section 12. The reinforcing plies and the breaker strips are positioned in the usual manner in the casing 11 and are not shown in the drawings.

Preferably the inner part of the casing is coated or has formed integrally therewith a self-sealing compound or material 14. The self-sealing compound 14 is of the type adapted to seal punctures which may be made in the tire casing.

The principles of the invention are herein described and illustrated in the drawings in connection with a so-called dropped center rim 16. However, it will be obvious that the principles of the invention are equally well applicable to the flat type of rim or those having splits therein to facilitate the mounting of the tire casing thereon. As shown in Fig. 2, the dropped center rim 16 has depending flanges 17 adapted to engage the outside of the tire beads and to retain the beads when the tire is inflated.

In accordance with this invention a circular groove is provided in each bead of said casing and adapted to hold said Semi-Tube thereon by means of a vacuum as hereinafter set forth. In order to provide a large groove to have sufficient vacuum capacity each bead of said casing is made somewhat longer and larger than may be found in the conventional type of casing. While it may be desirable to have large and deep grooves as described above, it is possible that the Semi-Tube, by the pressure of air, expands into said groove. The Semi-Tube may be prevented from expanding into the area of the open face of said groove by any suitable means. In the preferred form of my invention the area of the open face of said groove is reduced by means of a dividing web 20 therein whereby two independent grooves 19 in each side of said web 20 are formed. A vent or opening 21 is provided in said web to establish air communication between said two grooves 19 in each of said beads.

Adapted to cover the open sides or faces of the grooves 19 as well as the dropped center part of the rim 16 is the above mentioned Semi-Tube, indicated generally by reference numeral 22, and as shown in Fig. 2, it has a substantially U-shaped cross-sectional configuration. The Semi-Tube 22 is of sheet material in the form of a continuous ring surrounding the rim 16 and when in place engages the opposite inside faces of the bead sections of the tire casing. The Semi-Tube 22 is made of expansible, flexible and airtight material which may be similar to the material used in inner tubes of the present day automobile type tires.

In a preferred embodiment of the invention a single valve unit, such as 24, having a reduced diameter section 23, is provided for each pair of grooves 19, whereby air may be exhausted from or admitted to the grooves 19 in a manner and for the purposes hereinafter set forth. However, each pair of grooves may be provided with separate valves, one for admitting air thereto and another for exhausting the air therefrom.

The valve unit 24 leading into the grooves or vacuum chambers 19 from the outside of the casing 11 may be vulcanized in the bead. As more clearly shown in Fig. 3, the valve unit 24 contains a valve core, indicated generally by reference numeral 26. The core is adapted to prevent the free flow of air in a certain direction, as from right to left as shown in Fig. 3. The valve unit 24 has a cap 27 to prevent dirt from entering the valve unit and interferring with the proper operation of the valve core.

There is a valve unit 24 in each of the beads of the tire casing and they provide the means for establishing and maintaining a vacuum in the grooves or vacuum chambers 19 in a manner hereinafter set forth.

The Semi-Tube 22 has a valve 28 associated therewith which extends through the usual valve opening 29 in the tire rim. This valve is of conventional construction and permits air under pressure to be admitted to the tire casing for inflating the tire, and prevents the free escape of air therefrom. The valve 28 communicates with the inner side of the Semi-Tube by means of the passageway 31.

As shown in Figs. 1 and 2, the edges of the circular Semi-Tube are folded back upon themselves to form a bead 35, and preferably vulcanized to firmly retain a metal circular deformable ring or spring wire 32. The rings 32 while flexible give a certain desired stiffness to the Semi-Tube which facilitates the installation thereof in the tire casing as will be presently set forth.

As can be seen particularly in Fig. 2, the extreme inner edges of said beads are extended toward each other to provide circular projections 34 which may be used as a limiting guard or stop for mounting the Semi-Tube. The diameter of said guard 34 is somewhat larger than the diameter of said wire ring 32, so as to provide a clearance space C as shown in Fig. 2. This clearance C facilitates the mounting of the Semi-Tube in the casing.

In the mounting of the Semi-Tube in the tire casing, the casing may be placed on its side in a horizontal position and the Semi-Tube 22 inserted therein. To facilitate the correct positioning of the Semi-Tube in the tire, an identification mark 33 on each side thereof is provided and it is made concentric with the inner surface of the bead. When one side of the Semi-Tube, such as the lower one, is correctly positioned, a vacuum pump is connected to the valve unit 24 to exhaust air from the chambers 19, and since the side of the Semi-Tube will at this time be covering the vacuum chambers 19, establishment of the vacuum therein will hold this side of the Semi-Tube in place. The tire unit is then turned over and the other side of the Semi-Tube is similarly positioned and held in place by establishing a vacuum in its vacuum chambers 19. The tire and Semi-Tube may then be mounted on the rim and the tire inflated by means of the valve 28. The establishment of air pressure within the tire casing assists the vacuum in the vacuum chambers 19 in holding the sides of the Semi-Tube against the inside faces of the tire beads and thus establish an airtight seal between the beads.

When it is desired to dismount the tire from the rim, the air from the casing is permitted to escape from the valve 28 whereupon the tire and Semi-Tube may be removed from the rim. If the engaging surfaces of the Semi-Tube and the connecting faces of the casing beads tend to tightly adhere to each other and prevent ready removal of the Semi-Tube from the casing, the valve core 29 is removed and air admitted to the outer end of the valve unit 24 establishing air pressure within the vacuum chambers 19. This pressure causes the engaging surfaces to be blown apart. The removal of the valve core 26 breaks the vacuum in the vacuum chambers 19 prior to the establishment of the air pressure therein.

*Summary*

From what has been described it will be evident that the pneumatic tire of the present invention incorporates therein (a) A removable annular Semi-Tube of substantially U-shaped cross-section.
(b) A removable Semi-Tube having annular beads or anchors at the edges thereof to assist in anchoring and properly locating the Semi-Tube in the casing.
(c) A removable Semi-Tube having annular beads on the edges thereof and incorporating therein annular deformable rings or spring wires with the diameter of the rings larger than the diameter of the center opening of the tire casing.
(d) A Semi-Tube with beads reinforced by spring wires or the like to prevent the diameter of the edges of the Semi-Tube from changing under the pressure of the air used to inflate the tire.
(e) A tire casing having grooves or anchors on the inner faces of its rim engaging beads.
(f) A Semi-Tube for extending from one bead of the casing to the other.
(g) A casing and Semi-Tube in combination wherein the air pressure within the tire assists in holding the edges and beads of the Semi-Tube against the inner faces of the casing.

I have shown in the accompanying drawings only one form of said casing and said semi-Tube. It is, however, obvious that both said Semi-Tube and said vacuum chambers may be modified in size, shape, positions, relationship, etc., without departing from the spirit of my invention. For example, the open sides of the grooves such as 19 may be made to face toward the rotating axis of the casing instead of facing toward opposite surfaces of the beads as shown and described herein. With such modified location of the grooves the Semi-Tube must of course be modified accordingly. In this modified form, only the vacuum will hold the Semi-Tube against the face of the grooves instead of both the vacuum and the air pressure which together hold said Semi-Tube against the face of said grooves in the preferred form shown in the accompanying drawings.

It will be obvious that various other modifications may be made in the invention without departing from the spirit or essential attributes thereof, and it is desired therefore that only such limitations be placed thereon as are set forth in the appended claims.

What I claim is:

1. In a pneumatic tire, a casing having a set of spaced rim engaging beads, said beads having annular grooves in the inner opposite faces thereof with each of said grooves having an open side, an expansible Semi-Tube adapted to close the open sides of said grooves and to span the space between the grooves in opposite beads, said Semi-Tube thereby making fluid tight chambers of said grooves, and valve means for establishing a partial vacuum in said chambers to hold said Semi-Tube in fluid tight relation with said grooves, said valve means also being adapted to be used for admitting air to said chambers to force separation of said Semi-Tube from the beads of said casing when it is desired to disassemble said tire.

2. In a pneumatic Semi-Tube tire, a casing having a pair of spaced apart rim engaging beads, each of said beads having coextensive grooves on the inner adjacent faces thereof, a Semi-Tube adapted to span the space between the beads and adapted to cover the grooves in the adjacent faces of said beads, thereby forming a plurality of fluid tight chambers within said casing, and valve means adapted to be connected to means to establish a partial vacuum in said chambers, thereby maintaining said chambers fluid tight.

3. In a pneumatic tire, a casing having a pair of spaced apart rim engaging beads, each of said beads having grooves on the inner adjacent faces thereof, a Semi-Tube adapted to span the space between the beads and adapted to cover said grooves and thereby form a plurality of airtight chambers within said casing, and valve means communicating with said grooves to establish a partial vacuum in said chambers and to airtightly hold the engaging surfaces of said beads and said Semi-Tube together.

4. In a pneumatic tire for mounting on a rim, said tire comprising a Semi-Tube having open circular edges, a cooperating casing having a pair of compound beads, each of said compound beads consisting of a rim mounting section and a Semi-Tube holding section, said rim mounting section being devised to have the conventional rigidity proportional to the capacity of said tire, said Semi-Tube holding section comprising annular grooves having valve means communicating therewith whereby a partial vacuum may be imposed upon said grooves to hold said Semi-Tube.

5. In a pneumatic tire, a compound casing comprising a plurality of component parts and having a plurality of coextensive annular airtight channels common to and formed by the co-operation of said component parts, valves for said channels, said component parts being held airtight against each other by the reduction of the air pressure in said channels with respect to atmospheric pressure through said valves.

6. In a compound pneumatic tire, a casing having a pair of spaced apart rim engaging beads, an expansible Semi-Tube adapted to partially overlap said beads and span the gap therebetween, means including annular grooves in said beads adapted to be connected to a source of negative pressure for establishing a partial vacuum between the overlapping surfaces of said beads and said Semi-Tube and for holding them in such relation during the assembly of said casing and said casing and said Semi-Tube.

7. In a pneumatic tire, a casing having a pair of spaced apart rim engaging beads, coextensive annular grooves formed in the inside opposite faces of said beads, an annular Semi-Tube of expansible sheet material of substantially U-shaped cross-section adapted to bridge the space between said beads and to form closures for the grooves therein, and means to impress sub-atmospheric pressures in said grooves to join said Semi-Tube in fluid tight relation with said casing.

8. In a pneumatic tire, a casing having spaced beads and containing a plurality of sets of coextensive annular channels, means providing communication between said sets of channels, a Semi-Tube for closing said channels and bridging the space between said beads, and valves communicating with said channels, said Semi-Tube being held airtight against said beads by reducing the air pressure to sub-atmospheric in said channels through said valves.

9. In a pneumatic vehicle tire, a casing having a pair of spaced apart annular rim engaging beads, each of said beads having at least two coextensive grooves on the inner adjacent faces thereof, a Semi-Tube of U-shaped cross-section, each of the free edges of said Semi-Tube carrying an annular reinforcing member, annular engageable faces formed on said beads and adapted to be engaged by said edges, zones in said Semi-Tube bordering said edges being adapted to cooperate with the faces of said beads and cover said grooves, a central zone in said Semi-Tube being adapted to engage said beads and span the space between them, the diameters of said annular reinforcing members being substantially less than the diameters of said grooves, and conduit means communicating with said grooves extending exteriorly of said casing.

10. A tire according to claim 9 wherein said beads are substantially thick in a radial sense, and wherein each of such beads has a pair of communicating grooves therein, said conduit means containing a valve.

11. In a pneumatic tire, a casing having a pair of spaced apart rim engaging beads, a cooperating removable annular Semi-Tube of U-shaped cross-section with deformable beads adjacent the edges thereof of greater diameter than that of the central opening in said casing, reinforcing means included in said Semi-Tube beads, the free edges of said Semi-Tube being adapted to engage cooperative ledges carried on the inner surfaces of said casing beads, said ledges and said bead defining closed fluid channels between said Semi-Tube and said casing, said channels having their contours formed partly by said Semi-Tube and partly by said casing, and valve means on said tire comprising a valve for and adapted to admit air at sub-atmospheric pressure into said channels.

12. A pneumatic tire casing having spaced apart rim engaging beads, a Semi-Tube to overlap the beads of said casing and span the space therebetween, and means to alternately hold and release said Semi-Tube to and from said casing, said means comprising at least one fluid tight chamber between each of the overlapped surfaces of said beads and said Semi-Tube and valve means communicating with said chambers to enable both sub-atmospheric and above-atmospheric pressures to be formed in said chambers.

References Cited in the file of this patent

UNITED STATES PATENTS

| Number | Name | Date |
|---|---|---|
| 800,308 | De Laski et al. | Sept. 26, 1905 |
| 1,302,447 | Stark et al. | Apr. 29, 1919 |
| 1,619,812 | Develay | Mar. 8, 1927 |
| 1,621,388 | Wheatley | Mar. 15, 1927 |
| 1,626,512 | Clark | Apr. 26, 1927 |
| 1,653,054 | Mack | Dec. 20, 1927 |
| 1,658,646 | Michelin | Feb. 7, 1928 |
| 1,754,836 | Schenuit | Apr. 15, 1930 |
| 2,169,041 | Gammeter | Aug. 8, 1939 |
| 2,497,518 | Salcy | Feb. 14, 1950 |
| 2,530,213 | Sutton | Nov. 14, 1950 |
| 2,560,609 | Van Hulzen | July 17, 1951 |

FOREIGN PATENTS

| Number | Country | Date |
|---|---|---|
| 10,272 | Great Britain | 1898 |
| 574,578 | Great Britain | Jan. 11, 1945 |
| 615,614 | Germany | July 5, 1934 |